(12) United States Patent
Hanai et al.

(10) Patent No.: US 10,737,957 B2
(45) Date of Patent: Aug. 11, 2020

(54) WASTEWATER TREATMENT METHOD AND WASTEWATER TREATMENT SYSTEM

(71) Applicants: FUJI ELECTRIC CO., LTD., Kawasaki-shi, Kanagawa (JP); UTSUNOMIYA UNIVERSITY, Utsunomiya-shi, Tochigi (JP)

(72) Inventors: Yosuke Hanai, Tokyo (JP); Eiju Nakada, Yokohama (JP); Yasuzo Sakai, Utsunomiya (JP)

(73) Assignees: FUJI ELECTRIC CO., LTD., Kawasaki (JP); UTSUNOMIYA UNIVERSITY, Utsunomiya (JP)

( * ) Notice: Subject to any disclaimer, the term of this patent is extended or adjusted under 35 U.S.C. 154(b) by 0 days.

(21) Appl. No.: 16/022,297

(22) Filed: Jun. 28, 2018

(65) Prior Publication Data

US 2018/0305227 A1    Oct. 25, 2018

Related U.S. Application Data

(63) Continuation of application No. PCT/JP2017/008530, filed on Mar. 3, 2017.

(30) Foreign Application Priority Data

Mar. 8, 2016   (JP) ................................ 2016-044541

(51) Int. Cl.
   *C02F 1/48*    (2006.01)
   *B03C 1/247*   (2006.01)
   (Continued)

(52) U.S. Cl.
   CPC .............. *C02F 1/488* (2013.01); *B01D 21/01* (2013.01); *B03C 1/00* (2013.01); *B03C 1/005* (2013.01);
   (Continued)

(58) Field of Classification Search
   CPC .......... C02F 1/488; C02F 1/5245; C02F 1/52; C02F 1/50; C02F 1/008; C02F 2209/10;
   (Continued)

(56) References Cited

U.S. PATENT DOCUMENTS 4,505,776 A * 3/1985 Murray .................. B01D 53/52
                                              162/30.11
5,932,112 A * 8/1999 Browning, Jr. ......... B63B 11/04
                                              210/750

(Continued)

FOREIGN PATENT DOCUMENTS

CA    2825752 A1    8/2012
FR    2826931 A1    1/2003
(Continued)

OTHER PUBLICATIONS

International Search Report dated May 16, 2017 in corresponding International Patent Application No. PCT/JP2017/008530.
(Continued)

*Primary Examiner* — David C Mellon

(57) ABSTRACT

System and method for treating scrubber and ballast wastewater at the same time. The method includes mixing ballast and scrubber wastewater to make a suspended solid concentration or turbidity of the obtained wastewater mixture constant, the scrubber wastewater produced by bringing exhaust gas and scrubber washing water into contact with each other in a scrubber; adding magnetic powder to the wastewater mixture; and magnetically separating magnetic flocs obtained in the adding. The system includes a mixer that mixes ballast and scrubber wastewater to make a suspended solid concentration or turbidity of the obtained wastewater mixture constant, the scrubber wastewater produced by bringing exhaust gas and scrubber washing water into contact with each other in a scrubber; a magnetic powder adding device that adds magnetic powder to the
(Continued)

wastewater mixture obtained by the mixer; and a magnetic separator that magnetically separates magnetic flocs obtained by the magnetic powder adding device.

13 Claims, 4 Drawing Sheets

(51) Int. Cl.

| | | |
|---|---|---|
| C02F 1/50 | (2006.01) | |
| B03C 1/00 | (2006.01) | |
| C02F 1/52 | (2006.01) | |
| B01D 21/01 | (2006.01) | |
| B03C 1/14 | (2006.01) | |
| B03C 1/005 | (2006.01) | |
| C02F 1/00 | (2006.01) | |
| C02F 1/76 | (2006.01) | |
| C02F 1/78 | (2006.01) | |
| C02F 1/32 | (2006.01) | |
| C02F 103/00 | (2006.01) | |
| C02F 103/18 | (2006.01) | |

(52) U.S. Cl.
CPC ............... *B03C 1/14* (2013.01); *B03C 1/247* (2013.01); *C02F 1/008* (2013.01); *C02F 1/50* (2013.01); *C02F 1/52* (2013.01); *C02F 1/5245* (2013.01); *C02F 1/32* (2013.01); *C02F 1/76* (2013.01); *C02F 1/78* (2013.01); *C02F 2103/008* (2013.01); *C02F 2103/18* (2013.01); *C02F 2209/10* (2013.01); *C02F 2209/11* (2013.01)

(58) Field of Classification Search
CPC ...... C02F 1/32; C02F 1/78; C02F 1/76; C02F 2209/11; C02F 2103/18; C02F 2103/008; C02F 1/48; C02F 1/481; C02F 1/484; C02F 2201/48; B03C 1/14; B03C 1/00; B03C 1/247; B03C 1/005; B03C 1/01; B03C 1/015; B03C 1/23; B03C 1/24; B03C 1/10; B03C 1/12; B03C 1/30; B03C 2201/18; B03C 2201/20; B03C 2201/30; B01D 21/01; B01D 2257/30; B01D 2257/302; B01D 2257/304; B01D 2257/306; B01D 2257/308; B01D 2257/50; B01D 2257/502; B01D 2257/504; B01D 2257/40; B01D 2257/402; B01D 2257/404; B01D 2258/01; B01D 2258/012; B01D 2258/0283; B01D 53/38; B01D 53/40; B01D 53/46; B01D 53/48; B01D 53/485; B01D 53/50; B01D 53/52; B01D 53/523; B01D 53/526; B01D 53/54; B01D 53/56; B01D 53/565; B01D 53/60; B01D 53/62; B01D 53/77; B01D 53/78; B01D 53/92; B01D 53/922; B01D 53/96; B63J 4/00; B63J 4/002; B63J 4/006; F23J 2900/15041

See application file for complete search history.

(56) References Cited

U.S. PATENT DOCUMENTS

| | | | |
|---|---|---|---|
| 6,761,123 B2* | 7/2004 | Husain | B63J 4/002 |
| | | | 114/74 R |
| 10,363,523 B2* | 7/2019 | Toyama | B01D 53/502 |
| 2005/0230299 A1* | 10/2005 | Saho | B03C 1/284 |
| | | | 210/223 |
| 2009/0126618 A1 | 5/2009 | Winkler | |
| 2014/0060323 A1 | 3/2014 | Liu et al. | |
| 2017/0247274 A1* | 8/2017 | Pino-Jelcic | C02F 3/006 |
| 2017/0267555 A1* | 9/2017 | Hanai | B01D 21/30 |
| 2018/0037308 A1* | 2/2018 | Lee | B01D 53/60 |
| 2018/0243461 A1* | 8/2018 | Lee | A61L 9/20 |

FOREIGN PATENT DOCUMENTS

| | | |
|---|---|---|
| JP | 2003-104292 | 4/2003 |
| JP | 2010-269200 A | 12/2010 |
| JP | 2010-269248 | 12/2010 |
| JP | 2012-152708 | 8/2012 |
| JP | 2013-511384 | 4/2013 |
| JP | 5238968 | 4/2013 |
| KR | 1020140075204 A | 6/2014 |
| WO | WO 2009/019971 A1 | 2/2009 |
| WO | WO 2009/060813 A1 | 5/2009 |
| WO | WO 2011/062398 A1 | 5/2011 |
| WO | WO 2014/118819 A1 | 8/2014 |
| WO | 2016147708 A1 | 9/2016 |

OTHER PUBLICATIONS

Extended European Search Report dated Nov. 15, 2018 in corresponding European Patent Application No. 17763120.7.
Korean Office Action dated Oct. 18, 2018 in corresponding Korean Patent Application No. 10-2018-7018177.
English Translation of the Written Opinion of the International Searching Authority dated May 16, 2017 in corresponding International Application No. PCT/JP2017/008530.

\* cited by examiner

WASTEWATER TREATMENT METHOD AND WASTEWATER TREATMENT SYSTEM

CROSS REFERENCE TO RELATED APPLICATIONS

This application is a continuation application, filed under 35 U.S.C. § 111(a), of International Patent Application No. PCT/JP2017/008530 filed Mar. 3, 2017, which claims priority benefit under 35 U.S.C. § 119 of Japanese Patent Application No. 2016-044541 filed Mar. 8, 2016, the contents of which are incorporated herein by reference.

TECHNICAL FIELD

The present invention relates to a wastewater treatment method and to a wastewater treatment system.

BACKGROUND ART

In sailing operations of a ship, the ship discharges two kinds of wastewater called scrubber wastewater and ballast wastewater. These types of wastewater have been treated in different ways due to differences in properties between the two.

In the scrubber wastewater, impurities contained in the wastewater are suspended particles mainly composed of black carbon. The suspended particles are generally removed by a centrifugation method or a membrane separation method. In a method known as a scrubber wastewater treatment, for example, on occasions of intake and discharge of ballast water, the water quality of the ballast water is monitored, and it is treated with certain processes including magnetic separation, and whether to retain or to discharge the ballast water is determined based on monitoring results (for example, see Patent Document 1).

In addition, the primary impurities contained in ballast wastewater are microorganisms. For this reason, it is common practice to release ballast wastewater into ambient water after eliminating microorganisms by sterilization with chlorine or ozone.

REFERENCE DOCUMENT LIST

Patent Document

Patent Document 1: JP 5238968

SUMMARY OF THE INVENTION

Problem to be Solved by the Invention

As described above, a ship has been conventionally required to be quipped with treatment facilities suitable for the respective wastewater systems of the scrubber wastewater and the ballast wastewater, and accordingly has needed space in the ship for the wastewater treatments. In addition, since residual chlorine and residual ozone used in the ballast wastewater treatment adversely affect living organisms when released into seawater, facilities for neutralization and detoxification have also been necessary.

In view of these problems, there are demands for a method and a system for treating scrubber wastewater and ballast wastewater efficiently at the same time without having to provide multiple treatment facilities.

Means for Solving the Problem

According to an embodiment, the present invention is [1] a wastewater treatment method including: a mixing step of mixing ballast wastewater with scrubber wastewater to make a suspended solid concentration of the obtained wastewater mixture constant, the scrubber wastewater produced by bringing exhaust gas and scrubber washing water into contact with each other in a scrubber; a treatment step of adding a magnetic powder to the wastewater mixture; and a separation step of magnetically separating clumps of suspended solids and the magnetic powder (magnetic flocs) obtained in the treatment step.

In the wastewater treatment method according to [1], the mixing step preferably includes: a measurement step of measuring the suspended solid concentration of the scrubber wastewater or the suspended solid concentration of the wastewater mixture; and a control step of controlling a mixing ratio of the ballast wastewater and the scrubber wastewater depending on a measurement result in the measurement step.

In the wastewater treatment method according to [1], the mixing step preferably includes a measurement step of measuring the turbidity of the scrubber wastewater or the turbidity of the wastewater mixture; and a control step of controlling a mixing ratio of the ballast wastewater and the scrubber wastewater depending on a measurement result in the measurement step.

The wastewater treatment method according to any one of [1] to [3] preferably further includes a coagulation step of adding a coagulant to the magnetic flocs obtained in the treatment step, in which magnetic flocs obtained in the coagulation step are magnetically separated.

The wastewater treatment method according to any one of [1] to [4] preferably further includes a magnetic field application step of applying a magnetic field to the magnetic flocs.

The wastewater treatment method according to any one of [1] to [5] preferably further includes a sterilization step of performing a sterilization process on treated water after the magnetic flocs are separated therefrom in the separation step.

The wastewater treatment method according to any one of [1] to [6] preferably further includes a step of circulating treated water after the magnetic flocs are separated therefrom in the separation step into the scrubber wastewater.

The wastewater treatment method according to any one of [1] to [7] preferably further includes the steps of: returning treated water after the magnetic flocs are separated therefrom in the separation step to a scrubber wastewater tank that stores the scrubber wastewater; and circulating wastewater in the scrubber wastewater tank into the scrubber.

According to another embodiment, the present invention is [9] a wastewater treatment system including: a mixer that mixes ballast wastewater with scrubber wastewater to make a suspended solid concentration or turbidity of the obtained wastewater mixture constant, the scrubber water produced by bringing exhaust gas and scrubber washing water into contact with each other in a scrubber; a magnetic powder adding device that adds a magnetic powder to the wastewater mixture obtained by the mixer; and a magnetic separator that magnetically separates magnetic flocs obtained by the magnetic powder adding device.

In the wastewater treatment system according to [9], the mixer preferably includes: a measurement device that measures the suspended solid concentration of the scrubber wastewater or the suspended solid concentration or the turbidity of the wastewater mixture; and a controller that controls a mixing ratio of the ballast wastewater and the scrubber wastewater depending on a measurement result by the measurement device.

The wastewater treatment system according to [9] or [10] preferably further includes a coagulant adding device that adds a coagulant to the magnetic flocs obtained by the magnetic powder adding device.

In the wastewater treatment system according to any one of [9] to [11], it is preferable that the magnetic powder adding device include a treatment tank to which the magnetic powder is to be added, and that the treatment tank include a stirrer.

In the wastewater treatment system according to [11], it is preferable that the magnetic powder adding device include a treatment tank to which the magnetic powder is to be added, the coagulant adding device include a coagulation tank which is independent of the treatment tank and to which the coagulant is to be added, and at least one of the treatment tank and the coagulation tank include a stirrer.

The wastewater treatment system according to any one of [9] to [13] preferably further includes a magnetic field applying device that applies a magnetic field to the wastewater after the magnetic powder is added thereto.

The wastewater treatment system according to any one of [9] to [14] preferably further includes a sterilizer that performs a sterilization process on treated water after the magnetic flocs are separated therefrom by the magnetic separator.

The wastewater treatment system according to any one of [9] to [15] preferably further includes a unit that circulates treated water after the magnetic flocs are separated therefrom by the magnetic separator into the scrubber.

Effects of the Invention

According to the wastewater treatment system of the present invention, it is possible to treat scrubber wastewater and ballast wastewater simultaneously in the same treatment facility and to thereby to make the treatment facility more compact. In addition, by mixing the scrubber wastewater containing a large mass of suspended solids with the ballast water containing a small mass of suspended solids, it is possible to stabilize the turbidity of wastewater to be treated, and accordingly stabilize the suspended solid concentration in the wastewater to be treated. In addition, since ballast water, which has been conventionally released after treatment, is reusable as scrubber water, the capacity of a pump that feeds seawater to serve as scrubber water can be reduced.

MODE FOR CARRYING OUT THE INVENTION

Hereinafter, embodiments of the present invention are described with reference to the drawings. It should be noted, however, that the present invention is not limited to the embodiments described below. In addition, the drawings are exemplary schematic diagrams for explaining the present invention and are not at all intended to limit the present invention.

First Embodiment

According to a first embodiment, the present invention is a wastewater treatment method including: a mixing step of mixing ballast wastewater with scrubber wastewater to make a suspended solid concentration of the obtained wastewater mixture constant, the scrubber wastewater produced by bringing exhaust gas and scrubber washing water into contact with each other in a scrubber (dust collector); a treatment step of adding a magnetic powder to the wastewater mixture; and a separation step of magnetically separating clumps of suspended solids and the magnetic powder (magnetic flocs) obtained in the treatment step.

Figure 1:
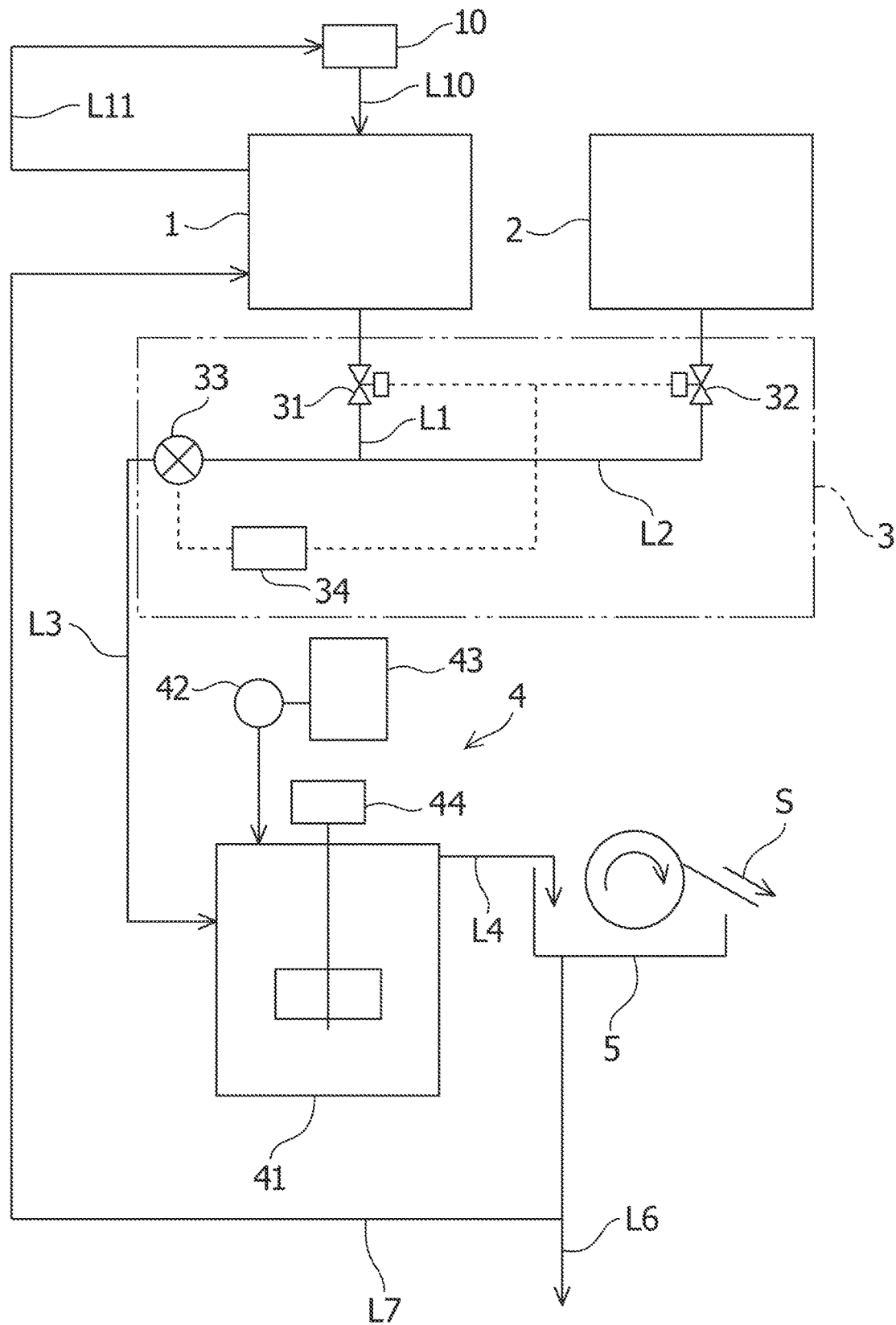
FIG. 1 is a conceptual diagram illustrating a wastewater treatment method and system according to a first embodiment of the present invention.

FIG. 1 illustrates a conceptual diagram of an example of a wastewater treatment system for carrying out the wastewater treatment method according to the first embodiment. With reference to FIG. 1, the wastewater treatment system of the present embodiment may mainly include a mixer 3, a magnetic powder adding device 4, and a magnetic separator 5. In addition, a scrubber wastewater tank 1 connected to a scrubber 10 and a ballast wastewater tank 2 may be provided upstream of the mixer 3.

The scrubber wastewater is wastewater produced by bringing the exhaust gas of the engine of a ship and scrubber washing water into contact with each other in the scrubber 10. As the scrubber washing water, pumped up seawater is usually used, but treated and circulated water may also be used optionally in the present invention. Main impurities in the scrubber wastewater are suspended solids originated from the exhaust gas. In general, the suspended solid concentration generally varies depending on the sailing conditions of the ship. In the present embodiment, the scrubber wastewater discharged from the scrubber 10 is stored in the scrubber wastewater tank 1 after flowing through a pipe L10, and then is directly used in treatment.

The ballast water is originated from water taken in at ports in various regions around the world. The ballast water is seawater in some cases or is fresh water in other cases, and contains aquatic organisms such as bacteria and plankton. The kinds of aquatic organisms vary depending on the site of intake, and the ballast water also greatly differs in water quality. The amount of ballast water depends on the cargo volume of a ship, and there is little ballast water in some cases. Then, when the ballast water becomes unnecessary, the ballast water is treated to reduce microorganisms and then discharged as ballast wastewater. In general, the suspended solid concentration in the ballast wastewater is low. In the present embodiment, the ballast wastewater is stored in the ballast wastewater tank 2. In the present embodiment, the ballast wastewater can be stored and treated as it is without any microorganism sterilization conducted with chlorine, ozone, or the like.

The mixing step is a step of mixing the ballast wastewater with the scrubber wastewater to make a suspended solid concentration or turbidity constant. In this step, it is preferable to mix the ballast wastewater with the scrubber wastewater so that the suspended solid concentration or the turbidity of the wastewater after the mixing (hereinafter also referred to as wastewater mixture) can be equal to or lower than a predetermined reference value. Such mixing under the control over the suspended solid concentration or the turbidity can be carried out by the mixer 3. The mixer may include, for example, a flow control valve 31 disposed at a discharge port of the scrubber wastewater tank 1, a flow control valve 32 disposed at a discharge port of the ballast wastewater tank 2, a suspended solid concentration measuring device 33, and a controller 34. Specifically, the controller 34 may carry out the above mixing by controlling the opening and closing of the valves 31 and 32 such that a value measured by the suspended solid concentration measuring device 33 can satisfy the predetermined concentration reference value.

The suspended solid concentration determined by the suspended solid concentration measuring device 33 may be measured in a method in conformity with the section 14.1 in JISK 0102 or the like. The aforementioned predetermined reference value for the suspended solid concentration is not limited to a particular reference value, but may be set to 100 mg/L or be instead set to 50 to 70 mg/L, for example. If the suspended solid concentration is 100 mg/L or lower, suspended solids can be removed stably without using a coagulant. Such a reference value, however, can be set as needed by a person skilled in the art. If the suspended solid concentration of the scrubber wastewater is lower than the reference value, there is no need to mix the ballast wastewater.

In another embodiment, not illustrated, a turbidity measuring device may be used in place of the suspended solid concentration measuring device. This is because the suspended solid concentration and the turbidity generally have a strong correlation and the turbidity can be also used as an indicator of the suspended solid concentration. In this case, the turbidity of the wastewater can be measured by a method in conformity with the section 9.3 in JISK 0101 or the like. Then, it is preferable to mix the ballast wastewater with the scrubber wastewater such that the turbidity can be equal to or lower than a predetermined reference value. The aforementioned predetermined reference value for the turbidity is not limited to a particular reference value, but may be set to 150 NTU or be instead set to 75 to 110 NTU, for example. If the turbidity is 150 NTU or lower, suspended solids can be removed stably in the subsequent steps without using a coagulant.

Here, in order to carry out the mixing step, the controller may also regulate the suspended solid concentration or the turbidity of the wastewater mixture by controlling the outputs and/or the flow rates of a pump to deliver the scrubber wastewater and a pump to deliver the ballast wastewater instead of the illustrated control valves 31 and 32. In another employable configuration, the suspended solid concentration measuring device 33 or the turbidity measuring device is not disposed in a pipe L3 in which the wastewater mixture flows, but is instead disposed inside of the scrubber wastewater tank 1 or in a pipe L1, and measures the suspended solid concentration or the turbidity of the scrubber wastewater before the mixing. In this case, for example, if the scrubber wastewater has a suspended solid concentration or turbidity low enough to be discharged to the outside of the ship, the scrubber wastewater can be also discharged before the mixing with the ballast wastewater. This is because the suspended solid concentration or the turbidity of the ballast wastewater is at a negligible level, in general. The mixing step according to the present embodiment just has to mix the ballast wastewater with the scrubber wastewater to make the suspended solid concentration or the turbidity approximately constant by using any means and is not limited to the specific ones mentioned above as the examples.

In addition to the suspended solid concentration measuring device or the turbidity measuring device, a device to measure another water quality of the wastewater before the mixing or after the mixing may be provided optionally. For example, a turbidimeter, a pH meter, a salt concentration meter, or the like may be disposed in a stage prior to a treatment tank 41. These measurements may be conducted in the pipe L3 where the wastewater mixture flows, or be conducted in the pipes L1, L2 or the water tanks 1, 2 in a stage prior to the pipe L3. Moreover, a device may be provided to control the water quality of the wastewater before flowing into the treatment tank 41 depending on the results of these measurements. As the device to control the water quality, there is, for example, a pH adjusting device that inputs an acid agent or an alkaline agent depending on a measurement result by a pH meter. It is preferable that the pH adjusting device adjust the pH to 4 to 11.

Next to the mixing step, the treatment step is carried out in which the magnetic powder is added to the wastewater mixture. The treatment step can be carried out by the magnetic powder adding device 4. With reference to FIG. 1, the magnetic powder adding device 4 may include the treatment tank 41, a magnetic powder adding pump 42, a magnetic powder storing tank 43, and a stirrer 44. The wastewater mixture, the concentration of which is controlled in the mixing step, is sent to the treatment tank 41 through the pipe L3. In the treatment tank 41, the magnetic powder stored in the magnetic powder storing tank 43 is added to the wastewater mixture by the magnetic powder adding pump 42, followed by mixing by the stirrer 44 inside the treatment tank.

As the magnetic powder, any usual magnetic powder for use in the water treatment field may be used, and either a paramagnetic powder or a ferromagnetic powder may be used. Examples of usable magnetic powders include, but are not particularly limited to, an iron oxide such as tiiron tetraoxide, cobalt, chromium oxide, ferrite, or the like. The particle size of the magnetic powder is usually preferably within a range of 0.05 µm to 10 µm, inclusive, and more preferably within a range of 0.05 µm to 5 µm, inclusive. In addition, the coercivity of the magnetic powder is usually preferably within a range of $10^4/4\pi$ A/m to $4 \times 10^5/4\pi$ A/m, inclusive, and more preferably within a range of $2 \times 10^5/4\pi$ A/m to $3 \times 10^5/4\pi$ A/m, inclusive.

The magnetic powder may be added in a powdered state or may be added in a state in which the magnetic powder is dispersed in a dispersion medium such as water. As for the amount of magnetic powder added, the magnetic powder is preferably added at a ratio of the magnetic powder mass to the suspended solid mass of 0.1 to 10:1 and is more preferably added at the ratio of 0.5 to 5:1. If the amount of magnetic powder added falls below the above range, the magnetic powder tends to decrease in the efficiency of forming magnetic flocs, whereas if the amount of magnetic powder added exceeds the above range, unnecessary excessive use of the magnetic powder may result in an increase in the cost in some cases. The present invention can be carried out by setting the amount of magnetic powder added to an approximately constant amount without making any particularly adjustment. This is because the suspended solid concentration is adjusted to be approximately constant in the mixer 3 in the preceding stage. Nevertheless, the amount of magnetic powder added may also be adjusted depending on the suspended solid concentration or the turbidity of the wastewater measured by the suspended solid concentration measuring device 33 or the turbidity measuring device. In this case, for example, the magnetic powder adding device 4 may store therein beforehand a relational table of the measured value of the suspended solid concentration or the turbidity with the amount of magnetic powder added, and determine the amount of magnetic powder added in reference to the relational table.

The treatment step adds the magnetic powder to the wastewater mixture, thereby forming magnetic flocs in which the magnetic powder and the suspended solids clump together. According to the water treatment method of the present embodiment, since the suspended solid concentration of the wastewater mixture is controlled at an approximately constant concentration in the mixing step, a fluctuation in the floc concentration in the treatment tank 41 can be kept small. Although not illustrated, the treatment tank 41 may be further provided with a magnetic field applying device to apply a magnetic field in the treatment step. When the magnetic field is applied to the treatment tank 41, the magnetic powder is magnetized, and the magnetic powder particles are promoted to clump together. In other words, it is possible to increase the flocculation rate, and thereby to promote the formation of magnetic flocs.

After the treatment step, the separation step is carried out in which the obtained magnetic flocs are magnetically separated. The separation step can be carried out by the magnetic separator 5. The wastewater mixture containing the magnetic flocs formed in the treatment step is sent to the magnetic separator 5 through a pipe L4. The magnetic separator 5 is capable of selectively removing sludge S composed of the magnetic flocs agglomerated and thereby separating treated water.

As the magnetic separator 5, any general magnetic separator for use in the water treatment field may be used, and is not particularly limited in terms of the type or mechanism. It is possible to use a magnetic separator with a structure capable of separating magnetic flocs by solid-liquid separation, and selectively taking out treated water while removing the agglomerated magnetic flocs as the sludge S. As an example of the magnetic separator 5, a magnetic separator may be used which includes a rotary disc or rotary drum equipped with a magnet and disposed such that a lower half side thereof is immersed in the wastewater fed from the treatment tank 41. In this case, sludge that originated from magnetic flocs and treated water can be separated by: causing magnetic flocs to adhere to the surface of the rotary disc or rotary drum by magnetic attraction force; and then scraping the agglomerated flocs from the surface of the rotary disc or rotary drum with a scraper. Instead, it is possible to use a magnetic separator installed on a pipe including an inline mixer. In this case, the magnetic separator can have a structure in which an electromagnet is disposed on an outer surface of a pipe connected to the pipe L4. While the electromagnet is on, magnetic flocs are attracted to the electromagnet and are accumulated on the inner side surface of the pipe. In an operation mode, which is additionally provided for sludge ejection, the sludge of the agglomerated magnetic flocs can be ejected from the pipe through a sludge ejection path by causing clean water to flow in place of the wastewater while the electromagnet is off.

Alternatively, part of the present embodiment may be constituted by a configuration in which the magnetic powder adding device and the magnetic separator are integrated together by employing a structure in which an electromagnet is disposed on the bottom surface of the treatment tank 41. In other words, it is possible to employ the configuration in which both the treatment step and the magnetic separation step are carried out in the treatment tank 41. In this case, while the electromagnet is on, magnetic flocs are attracted to the electromagnet and fixed to the bottom surface of the treatment tank 41. For sludge of the agglomerated magnetic flocs, an operation mode is additionally provided for sludge ejection, and the sludge can be ejected by feeding clean water instead of the wastewater to the treatment tank 41 while the electromagnet is off.

In the separation step, the suspended solids and the microorganisms are removed as the sludge S. The treated water from which the sludge is separated is released through a pipe L6 into surrounding water outside the ship if the microorganism concentration and the suspended solid concentration are equal to or lower than legal standard values. If these concentrations do not satisfy the standards, the treated water can be returned to the scrubber wastewater tank 1 through a pipe L7, in some cases further be circulated through a pipe L11 into and reused in the scrubber 10, and then be fed for retreatment. In addition, a general sterilization process such as chlorine feeding, ultraviolet sterilization, ozone sterilization, or membrane filtering may be optionally conducted on treated water before the release. Thus, the wastewater treatment system according to the present embodiment may include a sterilization device necessary for any of these sterilization processes, such as a chlorine feeder, an ultraviolet sterilizer, an ozone sterilizer, and a membrane filter device. In the present embodiment, microorganisms are mostly removed from the treated water by the magnetic separator, and accordingly the load on the sterilization device is small. Further, the treated water can be also reused by being returned to the scrubber wastewater tank 1 through the pipe L7, and being circulated into the scrubber 10 through the pipe L11. The treated water reduces the suspended solid concentration of the scrubber wastewater in the scrubber wastewater tank 1, and the resultant water can be used as scrubber washing water by being circulated into the scrubber 10. Then, the circulation and use of treated water produces an additional advantage in that a motive power to pump up scrubber washing water from the outside of the ship can be reduced.

With the wastewater treatment method and the wastewater treatment system according to the first embodiment, it is possible to treat the scrubber wastewater and the ballast wastewater simultaneously in a single system. In addition, since the suspended solid concentration of the wastewater mixture before the addition of the magnetic powder can be adjusted to be approximately constant in the mixing step, the properties of the wastewater mixture can be kept approximately constant. For this reason, without adding a coagulant, the formation of magnetic flocs can be carried out stably and the suspended solids and microorganisms in the wastewater can be removed efficiently at the same time in the magnetic separation in the subsequent stage.

Second Embodiment

According to a second embodiment, the present invention is a wastewater treatment method including: a mixing step of mixing ballast wastewater with scrubber wastewater to make a suspended solid concentration of the obtained wastewater mixture constant, the scrubber wastewater produced by bringing exhaust gas and scrubber washing water into contact with each other in a scrubber; a treatment step of adding a magnetic powder to the wastewater mixture; a coagulation step of adding a coagulant to magnetic flocs obtained in the treatment step; and a separation step of magnetically separating magnetic flocs obtained in the coagulation step.

Figure 2:
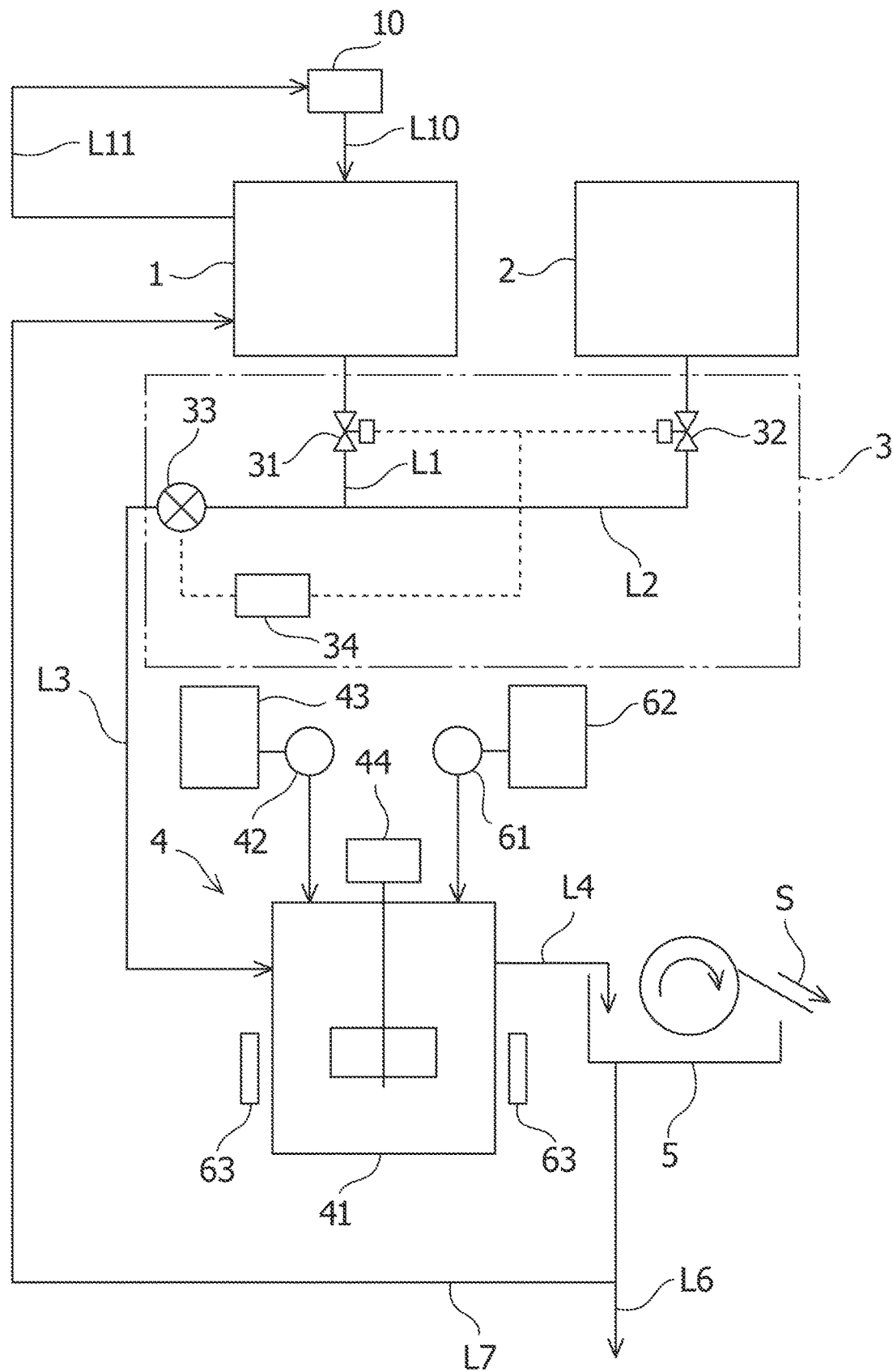
FIG. 2 is a conceptual diagram illustrating a wastewater treatment method and system according to a second embodiment of the present invention.

FIG. 2 illustrates a conceptual diagram of an example of a wastewater treatment system for carrying out the wastewater treatment method according to the second embodiment. With reference to FIG. 2, the wastewater treatment system of the present embodiment mainly includes a mixer 3, a magnetic powder adding device 4, a coagulant adding device 61, and a magnetic separator 5.

In addition, a scrubber wastewater tank 1 connected to a scrubber 10 and a ballast wastewater tank 2 may be provided upstream of the mixer 3.

In the wastewater treatment method according to the second embodiment, the characteristics of the scrubber wastewater and the ballast wastewater are the same as in the first embodiment, and the explanation thereof is omitted herein. Moreover, the mixing step and the treatment step can be carried out in the mode illustrated in the first embodiment using the devices illustrated in the first embodiment, and therefore, the explanation thereof is also omitted. The second embodiment is different from the first embodiment in that the wastewater treatment method further includes the coagulation step after the treatment step, and offers an option to apply a magnetic field in the coagulation step.

The coagulation step is a step of adding a coagulant to magnetic flocs obtained in the treatment step. With reference to FIG. 2, the coagulation step can be carried out by the coagulant adding device 61. With reference to FIG. 2, typically, the coagulant adding device 61 may be a coagulant adding pump, and adds the coagulant stored in a coagulant storing tank 62 to the treatment tank 41. The addition of the coagulant can be carried out while the stirrer 44 is stirring the wastewater. In the illustrated embodiment, the treatment step of adding the magnetic powder and the coagulation step of adding the coagulant can be carried out in the same treatment tank 41. These steps can be carried out practically at the same time.

The coagulant may be added in a powdered state or be added in a state in which the coagulant is dispersed in a dispersion medium such as water. Examples of the component of the coagulant include polyaluminum chloride (PAC), ferric polysulfate (poritetsu), aluminum sulfate (cake alum), polymers (nonionic, cationic, anionic, and amphoteric), and the like, and a coagulant can be selected depending on the properties of the wastewater. As for the amount of coagulant added, the coagulant is preferably added at a ratio of the coagulant mass to the suspended solid mass of 0.005 to 1:1 and is more preferably added at the ratio of 0.01 to 0.5:1. If the amount of coagulant added falls below the above range, the coagulant tends to decrease in the efficiency of assisting the formation of magnetic flocs in some cases, whereas if the amount of coagulant added exceeds the above range, unnecessary excessive use of the coagulant may result in an increase in the cost in some cases. The present embodiment has an advantage in that a constant amount of coagulant added can be used without needing any particular adjustment, because the suspended solid concentration is adjusted to the predetermined value or lower in the mixing step. Nevertheless, the amount of coagulant added may also be adjusted optionally depending on the suspended solid concentration or the turbidity measured in the mixing step. In this case, a controller for the amount of coagulant added may store therein beforehand a relational table of the measured value with the amount of coagulant added, and determine the amount of coagulant added in reference to the relational table. For example, if a sufficient amount of ballast water is not present, the suspended solid concentration cannot be adjusted to the predetermined value or lower. In this case, it is preferable to perform control of increasing the amount of coagulant added.

In the second embodiment, the treatment tank 41 is equipped with a magnetic field applying device 63 that applies a magnetic field. The magnetic field applying device 63 may be any device capable of applying a weak magnetic field to the magnetic powder. When the magnetic field is applied to the treatment tank 41, the magnetic powder is magnetized, and the magnetic powder particles are promoted to clump together. In other words, it is possible to increase the flocculation rate and thereby promote the formation of magnetic flocs. Note that the magnetic field applying device 63 is an optional constituent element, and the second embodiment may not include any magnetic field applying device in some cases.

In another embodiment, not illustrated, in addition to the treatment tank, an independent coagulation tank may be provided in a stage subsequent to the treatment tank. In this case, the coagulation tank includes a coagulant adding device (pump), a coagulant storing tank, and a stirrer, and may optionally include a magnetic field applying device.

The wastewater mixture containing magnetic flocs after the coagulation step in the treatment tank 41 is sent to the magnetic separator 5 through the pipe L4. The magnetic separator 5 is capable of selectively removing sludge S in which the magnetic flocs agglomerate together, and thereby separating treated water. A configuration of the magnetic separator 5 may be any of the configurations explained in the first embodiment or any other configuration as needed. In addition, part of the present invention may be constituted by a configuration in which the magnetic separator 5 and either the treatment tank 41 or the coagulation tank, not illustrated, are integrated together by employing a structure in which an electromagnet is disposed on the bottom surface of the treatment tank 41 or the coagulation tank.

Also in the second embodiment, the suspended solids and the microorganisms are removed as the sludge S in the separation step. The treated water from which the sludge is separated can be released through a pipe L6 into surrounding water outside the ship if the microorganism concentration and the suspended solid concentration are equal to or lower than legal standard values. If any of these concentrations does not satisfy the standard, or if necessary, the treated water can be circulated into the scrubber wastewater tank 1 through a pipe L7 and fed to the retreatment. As explained in the first embodiment, a stage subsequent to the separation step and prior to the release of the treated water may be provided with a sterilizer and perform a sterilization step. Moreover, the treated water may be circulated into the scrubber wastewater tank 1 through a pipe L7 to reduce the suspended solid concentration of the scrubber wastewater, and then the resultant water may be circulated to the scrubber 10 through a pipe 11 and used as scrubber water.

In the wastewater treatment method and the wastewater treatment system according to the second embodiment, the coagulant adding device is further provided and the step of adding a coagulant is included. This enables a stable wastewater treatment Even if the suspended solid concentration or the turbidity of scrubber wastewater fluctuates more greatly. Furthermore, the configuration capable of applying a magnetic field to the treatment tank or the coagulation tank to which the coagulant is added may lead to a significant reduction in the treatment time by promoting the formation of magnetic flocs.

EXAMPLES

Hereinafter, the present invention is explained in more detail with reference to Examples. However, the present invention is not limited to Examples described below.

Example 1

The present system was examined in the performance of removing suspended solids and microorganisms. Scrubber actual wastewater was mixed with *Escherichia coli* as microorganisms in an amount of 1000 cfu, and supernatant of the wastewater thus prepared and then left to stand was collected and used as test wastewater for wastewater mixture in the present invention. A comparison was made among three kinds of samples, that is, the test wastewater as it was, water prepared by magnetic separation with a magnetic powder and polyaluminum chloride (PAC) added to the test wastewater, and water prepared by magnetic separation with the magnetic powder and polyaluminum chloride (PAC) first added and then a polymer coagulant added to the test wastewater. The magnetic powder (triiron tetraoxide) was added at a ratio of 1:1 relative to the suspended solid mass, the PAC was added such that the an ALT ratio to the turbidity after the addition of the magnetic powder was 5, and the resultant wastewater mixture was stirred rapidly at 150 rpm for 20 seconds, and then stirred slowly at 20 rpm for 10 minutes. After that, the polymer coagulant was added in an amount of 0.01 ppm, followed by slow stirring to form magnetic flocs. The resultant sample was placed on a neodymium magnet, and the turbidity of and the live bacteria count in the supernatant of the sample were measured.

Figure 3:
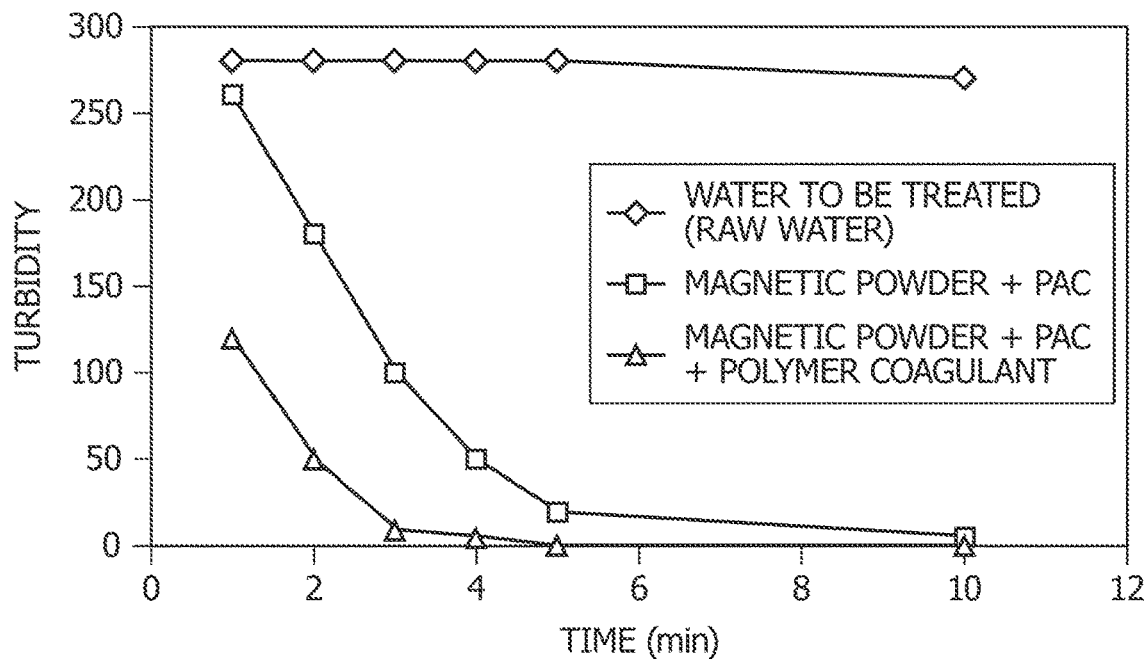
FIG. 3 is a graph showing a relationship between the treatment ti me and the turbidity of test wastewater in Example 1.
Figure 4:
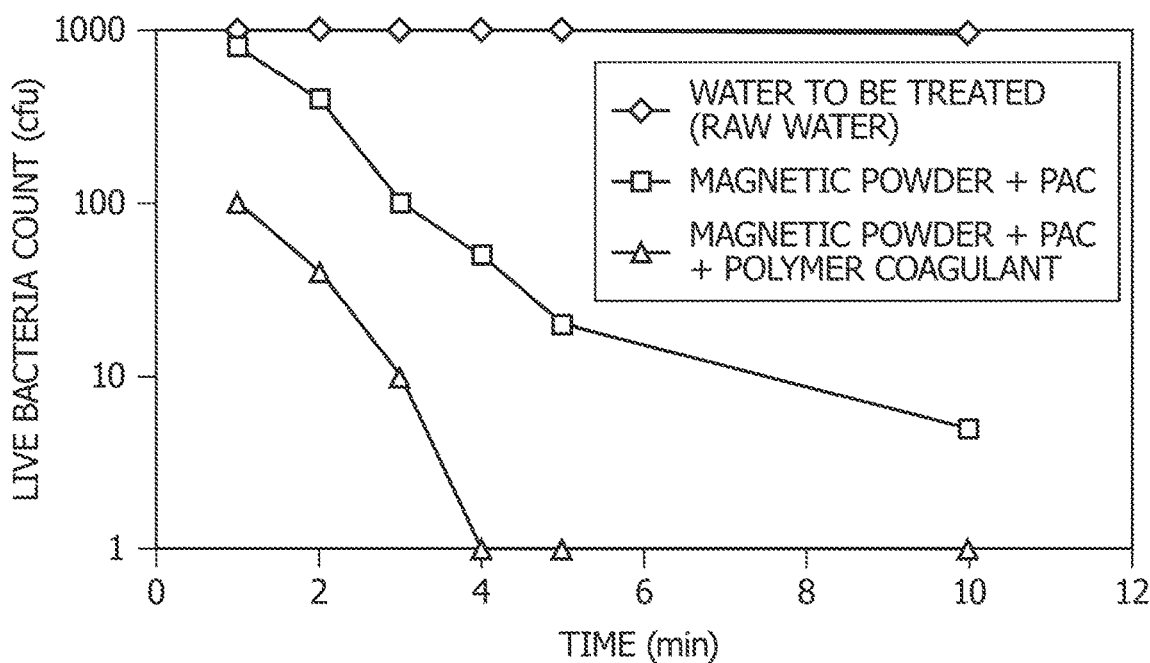
FIG. 4 is a graph showing a relationship between the treatment time and the live bacteria count in Example 1.

FIGS. 3 and 4 present the results. It was found that the present system was capable of sufficiently removing suspended matter and also reducing the live bacteria count.

Example 2

Figure 5:
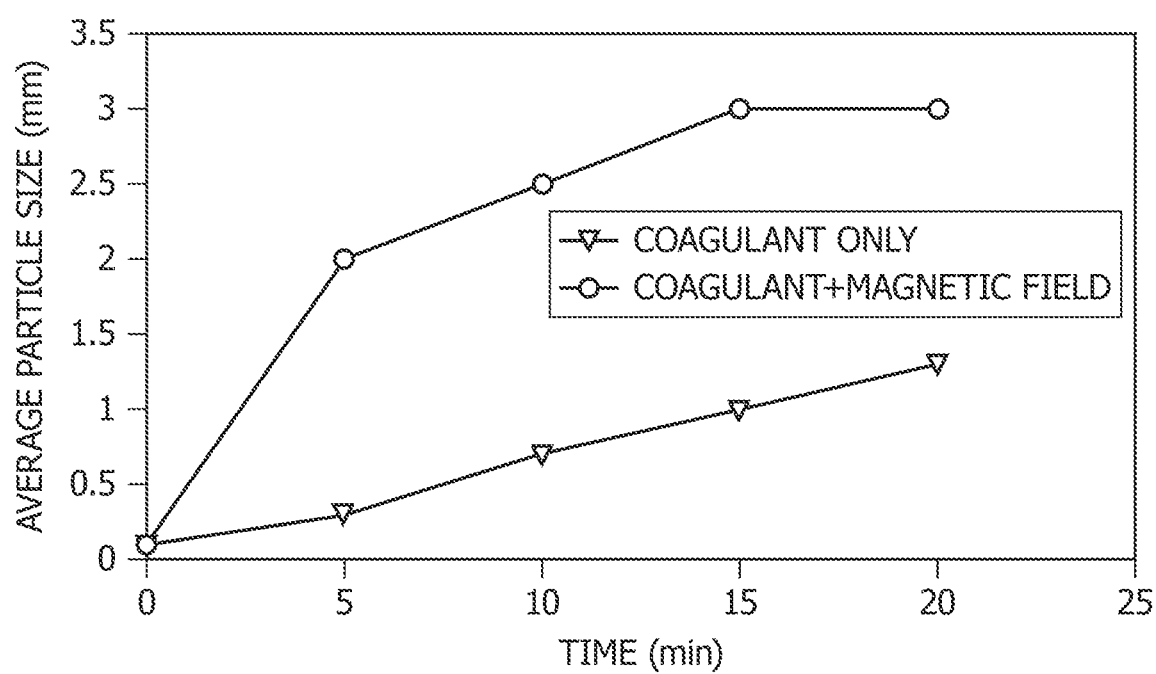
FIG. 5 is a graph showing a relationship between the treatment time and the average particle size of magnetic flocs in Example 2.

Subsequently, using the same test wastewater, a comparison in the particle size of magnetic flocs was made between a case of using coagulant only, and a case of a combination use of the coagulant and magnetic field application. The same coagulant as in Example 1 was used, and the PAC and the polymer coagulant were both added in the same amounts relative to the suspended solid mass as in Example 1. One of the samples thus prepared was subjected to application of a magnetic field by using a neodymium magnet at 0.4 T, and the other sample was used without application of a magnetic field. Then, a relationship between the floc size and the time was examined in which a time point of the addition of the coagulant was set to 0 minutes. The application of the magnetic field was continued during all the measurement. The flock size was measured by a particle size distribution system, and the median value was taken as the measured value. FIG. 5 presents a graph of the results. It was found that it took about 15 minutes for the floc size to reach 1 mm or more in the case of using the coagulant only, whereas the floc size reached 1 mm or more within 5 minutes in the case of the combination use with the magnetic field application. Therefore, it was found that a growth time of flocs can be greatly shortened by application of a magnetic field.

REFERENCE SYMBOL LIST 1 scrubber wastewater
10 scrubber
2 ballast wastewater
3 mixer
31 control valve
32 control valve
33 suspended solid concentration measuring device
34 controller
4 magnetic powder adding device
41 treatment tank
42 magnetic powder adding pump
43 magnetic powder storing tank
44 stirrer
5 magnetic separator
61 coagulant adding device (pump)
62 coagulant storing tank
63 magnetic field applying device

The invention claimed is:

1. A wastewater treatment method, comprising:
    obtaining a wastewater mixture by mixing ballast wastewater with scrubber wastewater and by controlling a mixing ratio of the ballast wastewater and the scrubber wastewater based on a measurement result relating to a suspended solid concentration of the wastewater mixture or a turbidity of the wastewater mixture, such that a suspended solid concentration of the wastewater mixture or a turbidity of the wastewater mixture is made constant, the scrubber wastewater having been produced by bringing exhaust gas into contact with scrubber washing water in a scrubber;
    adding a magnetic powder to the wastewater mixture to form magnetic flocs in the wastewater mixture; and
    magnetically separating the magnetic flocs from the wastewater mixture.

2. The wastewater treatment method according to claim 1, wherein the obtaining the wastewater mixture includes:
    measuring a suspended solid concentration of the scrubber wastewater or the suspended solid concentration of the wastewater mixture to obtain the measurement result relating to the suspended solid concentration of the wastewater mixture.

3. The wastewater treatment method according to claim 1, wherein the obtaining the wastewater mixture includes:
    measuring a turbidity of the scrubber wastewater or the turbidity of the wastewater mixture to obtain the measurement result relating to the turbidity of the wastewater mixture.

4. The wastewater treatment method according to claim 1, further comprising:
    adding a coagulant to the magnetic flocs which are formed by adding the magnetic powder to the wastewater mixture, and
    the magnetically separating the magnetic flocs from the wastewater mixture is performed after adding the coagulant to the magnetic flocs formed by adding the magnetic powder to the wastewater mixture.

5. The wastewater treatment method according to claim 1, further comprising applying a magnetic field to the magnetic flocs.

6. The wastewater treatment method according to claim 1, further comprising:
    obtaining treated water from the wastewater mixture by the magnetically separating the magnetic flocs from the wastewater mixture; and
    performing a sterilization process on the treated water.

7. The wastewater treatment method according to claim 1, further comprising:
    obtaining treated water from the wastewater mixture by the magnetically separating the magnetic flocs from the wastewater mixture; and circulating the treated water into a scrubber wastewater tank containing the scrubber wastewater.

8. The wastewater treatment method according to claim 1, further comprising:
   obtaining treated water from the wastewater mixture by the magnetically separating the magnetic flocs from the wastewater mixture;
   returning the treated water to a scrubber wastewater tank that stores the scrubber wastewater to reduce a suspended solid concentration of the scrubber wastewater; and
   circulating the scrubber wastewater in the scrubber wastewater tank having the reduced suspended solid concentration into the scrubber.

9. The wastewater treatment method according to claim 1, wherein adding the magnetic powder to the wastewater mixture to form magnetic flocs includes:
   adding the magnetic powder to the wastewater mixture in a powdered state or in a state in which the magnetic powder is dispersed in a dispersion medium,
   wherein the magnetic powder is added to the wastewater mixture such that a range of a ratio of a magnetic powder mass to a suspended solid mass is 0.1:1 to 10:1.

10. A wastewater treatment method, comprising:
    obtaining scrubber wastewater by bringing exhaust gas into contact with scrubber washing water in a scrubber;
    obtaining a wastewater mixture by mixing ballast wastewater with the scrubber wastewater and by controlling a mixing ratio of the ballast wastewater and the scrubber wastewater based on a measurement result relating to a suspended solid concentration of the wastewater mixture or a turbidity of the wastewater mixture, so that a suspended solid concentration of the wastewater mixture is less than a first predetermined reference value or a turbidity of the wastewater mixture is less than a second predetermined reference value;
    adding a magnetic powder to the wastewater mixture to form magnetic flocs in the wastewater mixture; and
    magnetically separating the magnetic flocs from the wastewater mixture.

11. The wastewater treatment method according to claim 10, wherein mixing the ballast wastewater with the scrubber wastewater includes:
    measuring a suspended solid concentration of the wastewater mixture to obtain the measurement result relating to the suspended solid concentration of the wastewater mixture, or measuring a turbidity of the wastewater mixture to obtain the measurement result relating to the turbidity of the wastewater mixture.

12. The wastewater treatment method according to claim 10, further comprising:
    measuring a suspended solid concentration to obtain the measurement result relating to the suspended solid concentration of the wastewater mixture, prior to mixing the ballast wastewater with the scrubber wastewater, or
    measuring a turbidity of the scrubber wastewater to obtain the measurement result relating to the turbidity of the wastewater mixture, prior to mixing the ballast wastewater with the scrubber wastewater.

13. A wastewater treatment method, comprising:
    obtaining scrubber wastewater by bringing exhaust gas into contact with scrubber washing water in a scrubber;
    obtaining a wastewater mixture by mixing ballast wastewater with the scrubber wastewater so that a suspended solid concentration of the wastewater mixture or a turbidity of the wastewater mixture is made constant, wherein
        when the suspended solid concentration of the wastewater mixture is to be made constant, the obtaining the wastewater mixture by mixing the ballast wastewater with the scrubber wastewater includes:
            measuring a suspended solid concentration of the scrubber wastewater or the suspended solid concentration of the wastewater mixture, and
            controlling a mixing ratio of the ballast wastewater and the scrubber wastewater based on a measurement result of the measuring to make the suspended solid concentration of the wastewater mixture constant,
        when the turbidity of the wastewater mixture is to be made constant, the obtaining the wastewater mixture by mixing the ballast wastewater with the scrubber wastewater includes:
            measuring a turbidity of the scrubber wastewater or the turbidity of the wastewater mixture, and
            controlling a mixing ratio of the ballast wastewater and the scrubber wastewater based on a measurement result of the measuring to make the suspended solid concentration of the wastewater mixture constant;
    adding a magnetic powder to the wastewater mixture to form magnetic flocs in the wastewater mixture; and
    magnetically separating the magnetic flocs from the wastewater mixture.

* * * * *